US011225306B2

(12) United States Patent
Chen et al.

(10) Patent No.: US 11,225,306 B2
(45) Date of Patent: Jan. 18, 2022

(54) HYDRODYNAMIC INTELLIGENT ROBOT AND CONTROL METHOD THEREOF

(71) Applicant: Xi'an Mingdu Photoelectric Technology Co., Ltd., Xi'an (CN)

(72) Inventors: Yongmao Chen, Xi'an (CN); Kai Sun, Xi'an (CN); Keqin Huang, Xi'an (CN); Yuzhen Ren, Xi'an (CN); Ming Zong, Xi'an (CN)

(73) Assignee: Xi'an Mingdu Photoelectric Technology Co., Ltd., Xi'an (CN)

( * ) Notice: Subject to any disclaimer, the term of this patent is extended or adjusted under 35 U.S.C. 154(b) by 0 days.

(21) Appl. No.: 16/931,451

(22) Filed: Jul. 17, 2020

(65) Prior Publication Data

US 2021/0024182 A1 Jan. 28, 2021

(30) Foreign Application Priority Data

Jul. 23, 2019 (CN) .......................... 201910667309.9

(51) Int. Cl.
*B63B 34/15* (2020.01)
*G01S 13/02* (2006.01)
*G05D 1/00* (2006.01)
*G05D 1/02* (2020.01)
*G05D 1/08* (2006.01)

(52) U.S. Cl.
CPC .......... *B63B 34/15* (2020.02); *G01S 13/0209* (2013.01); *G05D 1/0088* (2013.01); *G05D 1/0206* (2013.01); *G05D 1/0875* (2013.01)

(58) Field of Classification Search
CPC ..... B63B 35/00; B63B 34/15; G01S 13/0209; G05D 1/0088; G05D 1/0206; G05D 1/0875; B64C 35/006
See application file for complete search history.

(56) References Cited

U.S. PATENT DOCUMENTS

| | | | | |
|---|---|---|---|---|
| 3,700,172 A | * | 10/1972 | Gallegos, Sr. ......... | A63H 27/06 239/722 |
| 9,751,597 B1 | * | 9/2017 | Low ....................... | B63B 35/00 |
| 2015/0028161 A1 | * | 1/2015 | Parks ..................... | B63B 34/15 244/23 R |
| 2015/0360755 A1 | * | 12/2015 | Robinson ............... | B63B 34/15 440/42 |
| 2017/0080997 A1 | * | 3/2017 | Zapata ................... | B63H 11/113 |

(Continued)

*Primary Examiner* — Aaron L Troost (57) ABSTRACT

A hydrodynamic intelligent robot and a control method thereof, the robot includes a moving platform, a hydrodynamic system and a dynamic intelligent system. The hydrodynamic system includes at least one nozzle mounted on the moving platform and a hydrodynamic device electrically connected to the dynamic intelligent system and connected to the at least one nozzle by a pipeline for spraying water so that the moving platform is rotated and moved by spraying water through the nozzle; the dynamic intelligent system is configured to control the hydrodynamic device according to input instructions, so as to indirectly realize vector control of the nozzle's water quantity and control the moving platform to move autonomously and intelligently. The present disclosure can monitor states of the moving platform by pre-inputting control instructions, and automatically determine numerical parameters needed to be adjusted by algorithm, so as to realize autonomous intelligent motion of the moving platform.

4 Claims, 4 Drawing Sheets

(56) References Cited

U.S. PATENT DOCUMENTS

| | | | |
|---|---|---|---|
| 2017/0113787 A1* | 4/2017 | Hein | B64C 39/022 |
| 2019/0161188 A1* | 5/2019 | Zapata | B63B 34/15 |
| 2020/0172207 A1* | 6/2020 | Wengreen | B63B 32/60 |

* cited by examiner

HYDRODYNAMIC INTELLIGENT ROBOT AND CONTROL METHOD THEREOF

CROSS-REFERENCE TO RELATED APPLICATION

This application claims the benefit of priority from Chinese Patent Application No. 201910667309.9 entitled "HYDRODYNAMIC INTELLIGENT ROBOT AND CONTROL METHOD THEREOF" and filed on Jul. 23, 2019, the content of which is hereby incorporated by reference in its entire by reference.

BACKGROUND

Technical Field

The present disclosure generally relates to intelligent devices field, and especially relates to a hydrodynamic intelligent robot and a control method thereof.

Description of Related Art

At present, hydrodynamics products on the market are "water flyers" for water show, or named floating aircrafts or Flyboards, which are water flight amusement products come from France, invented by Franky Zapata. Such hydrodynamics product is provided for using recoil power of a foot-mounted sprinkler to lift a user above the water, and is equipped with a manual control nozzle for stabilizing flight attitude of the user in the air. However, only two blowholes are arranged on the Flyboard and a hand-held nozzle is supplemented, which can't intelligently and automatically control the Flyboard. Moreover, the Flyboard is manually operated, which requires more professional athletes to be trained to operate the performance. In this way, balance and stability are completely depended on the professional athletes, which is difficult to ensure safety of ordinary users.

Therefore, the hydrodynamic equipment in the conventional technology can't realize self-stabilization and operation control intelligently.

SUMMARY

The technical problems to be solved, in view of the shortcomings of the related art, the present disclosure provides to a hydrodynamic intelligent robot and a control method thereof which can overcome technical problems such as difficulty in operation, low safety and unintelligent control of conventional floating aircrafts.

The technical solution adopted for solving technical problems of the present disclosure is, a hydrodynamic intelligent robot of the present disclosure includes, a moving platform configured to rotate and move freely in space; a hydrodynamic system connected to the moving platform and comprising at least one nozzle mounted on the moving platform, and a hydrodynamic device connected to the at least one nozzle by a pipeline for spraying water for rotating and moving the moving platform by means of the at least one nozzle spraying water; a dynamic intelligent system electrically connected to the hydrodynamic device; and wherein the dynamic intelligent system is configured to control the hydrodynamic device according to input instructions, so as to indirectly realize vector control of the at least one nozzle's water quantity and control the moving platform to move autonomously and intelligently.

In the present disclosure, users can input control instructions with motion trajectory according to the dynamic intelligent system, for example, through a software visual interface operation; the dynamic intelligent system is configured to calculate a current position and an expected moving vector (including an angle and a hydrodynamic force) of the moving platform according to the control instructions, and then send a determined final control quantity to the hydrodynamic system, and then, the hydrodynamic system is configured to control water quantity and water angle sprayed from each nozzle according to the final control quantity, so as to control the moving platform to move in accordance with a recorded predetermined motion trajectory. The present structure can move intelligently and autonomously only by setting a motion trajectory rather than needing manual operation and control, which can overcome technical problems such as difficulty in operation, low safety and unintelligent control of conventional floating aircrafts.

In another aspect, a control method of a hydrodynamic intelligent robot according to an embodiment of the present disclosure includes, step S1, setting a moving platform that can rotate and move freely in space;

step S2, setting a hydrodynamic system connected to the moving platform so as to provide rotation and movement power for the moving platform;

step S3, setting a dynamic intelligent system for controlling the hydrodynamic system and inputting motion instructions of the moving platform via the dynamic intelligent system, and then controlling the hydrodynamic system to drive the moving platform to autonomously and intelligently move according to the motion instructions.

The present disclosure provides the advantages as below.

The hydrodynamic intelligent robot and the control method thereof of the present disclosure can overcome technical problems in the conventional technology of manual control robots, difficult operations, high risk of safety after mis-operation and low intelligence.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
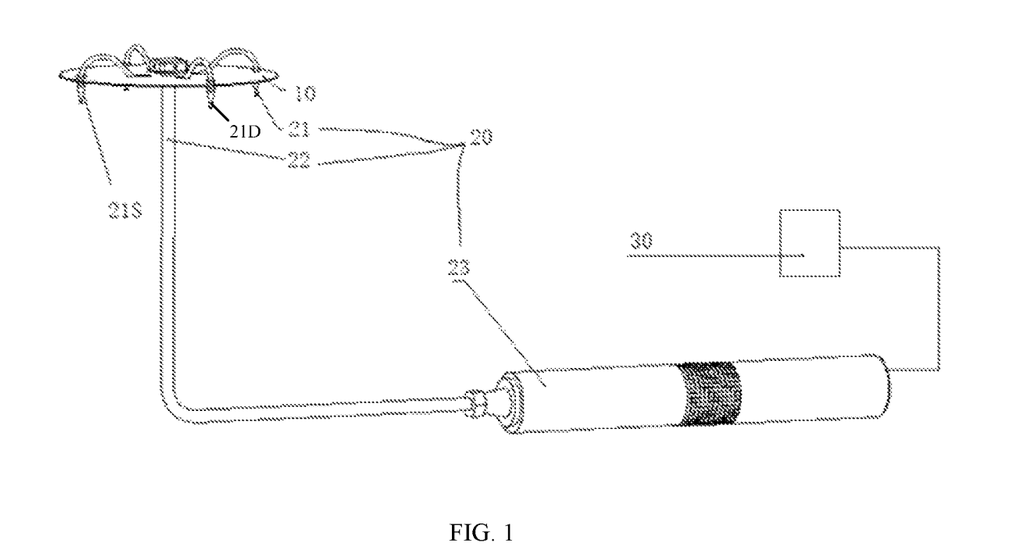
FIG. 1 is a schematic view of a hydrodynamic intelligent robot of the present disclosure.

Referring to FIG. 1, a hydrodynamic intelligent robot according to an embodiment of the present disclosure includes a moving platform 10, a hydrodynamic system 20 connected to the moving platform 10, and a dynamic intelligent system 30 connected to the hydrodynamic system 20.

Furthermore, the moving platform 10 can rotate and move freely in space, referring to FIG. 1, in an embodiment of the present disclosure, the moving platform 10 is designed disk-like configuration so that not only the hydrodynamic system 20 is conveniently arranged thereof, but also a direction and a speed of the moving platform 10 can be easily controlled because a distance between each edge of the disk-like moving platform 10 and a center point of the disk-like moving platform 10 is equal.

Furthermore, the hydrodynamic system 20 includes at least one nozzle 21 mounted on the moving platform 10, and a hydrodynamic device 23 connected to the at least one nozzle 21 by a pipeline 22 for spraying water for rotating and moving the moving platform 10 by means of the at least one nozzle 21 spraying water.

Specifically, in an embodiment of the present disclosure, the hydrodynamic system 20 further includes a vector adjusting nozzle 21S arranged on the center of the disk-like moving platform 10 so as to adjust directions of water spraying and control water spraying quantity.

In other embodiments of the present disclosure, the hydrodynamic system 20 includes a plurality of nozzles 21 evenly and uniformly spaced at edges of the moving platform 10 and at least one nozzle 21 is designed as the vector adjusting nozzle 21S. When the moving platform 10 is moved, the plurality of nozzles 21 can only provide a power corresponding to the water spraying quantity, while the vector adjusting nozzle 21S can not only provide the power corresponding to the water spraying quantity, but also can adjust a moving angle and a moving direction of the moving platform 10.

Furthermore, in a preferred arrangement scheme, four nozzles 21 are set up on the moving platform 10 that can only provide power rather than adjusting the moving angle, and a vector adjusting nozzle 21S is provided for adjusting the moving angle of the moving platform 10. The four nozzles 21 are evenly and uniformly spaced at outer edges of the moving platform 10, and the vector adjusting nozzle 21S is arranged downwardly on the center of the moving platform 10.

In other embodiments of the present disclosure, the hydrodynamic system 20 includes a plurality of nozzles 21, among which at least one inclining nozzle 21D is set at an inclined angle with the other nozzles 21 or the moving platform 10, such as an angle with 15° is formed between the at least one inclining nozzle 21D and the plurality of nozzles 21 or the moving platform 10. At work, the plurality of nozzles 21 are mainly provided to supply power so that only water spraying quantity of the plurality of nozzles 21 is needed to control; while, overall movement of the moving platform 10 can be adjusted by adjusting the at least one inclining nozzle 21D to control volume of water spraying.

Figure 2:
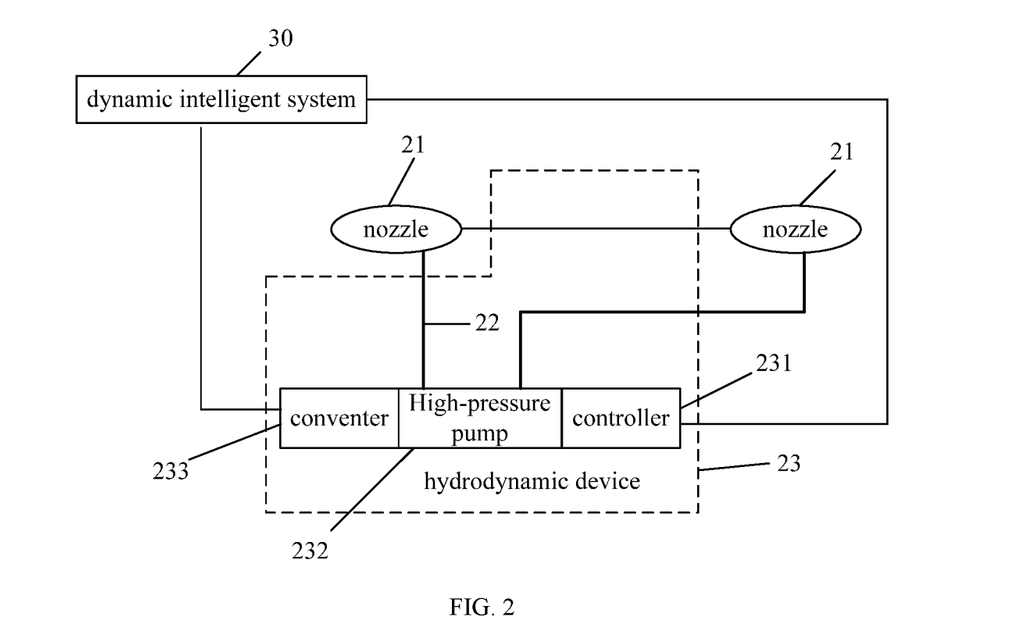
FIG. 2 is a schematic diagram of a hydrodynamic system of the hydrodynamic intelligent robot of the present disclosure.

Referring to FIG. 2, in an embodiment of the present disclosure, the hydrodynamic device 23 includes a plurality of nozzles 21, and a controller 231 connected to the plurality of nozzles 21;

a high-pressure pump 232 connected with the plurality of nozzles 21 through a plurality of pipelines 22 one to one; and a converter 233 connected to the high-pressure pump 232 and configured to control water output of the high-pressure pump 232;

a dynamic control module 24 electrically connected to the dynamic intelligent system 30 and controlled by the dynamic intelligent system 30; the dynamic control module 24 electrically connected to both the controller 231 and the converter 233; according to be controlled by the dynamic intelligent system 30, the dynamic control module 24 further configured to control the water output of the plurality of pipelines 22 connected with the high-pressure pump 232 and control a vector angle or a magnitude of a vector of the plurality of nozzles 21.

Furthermore, the dynamic control module 24 is further configured to adjust an angle of the vector adjusting nozzle 21S or control the water spraying quantity and a switching state of the inclining nozzle 21D set at an inclined angle with the moving platform 10 via the controller 231, so as to control the moving direction of the platform 10; the dynamic control module 24 is further configured to control the water output of the plurality of pipelines 22 and the plurality of nozzles 21 via controlling the converter 233, so as to control the moving speed of the moving platform 10.

Figure 3:
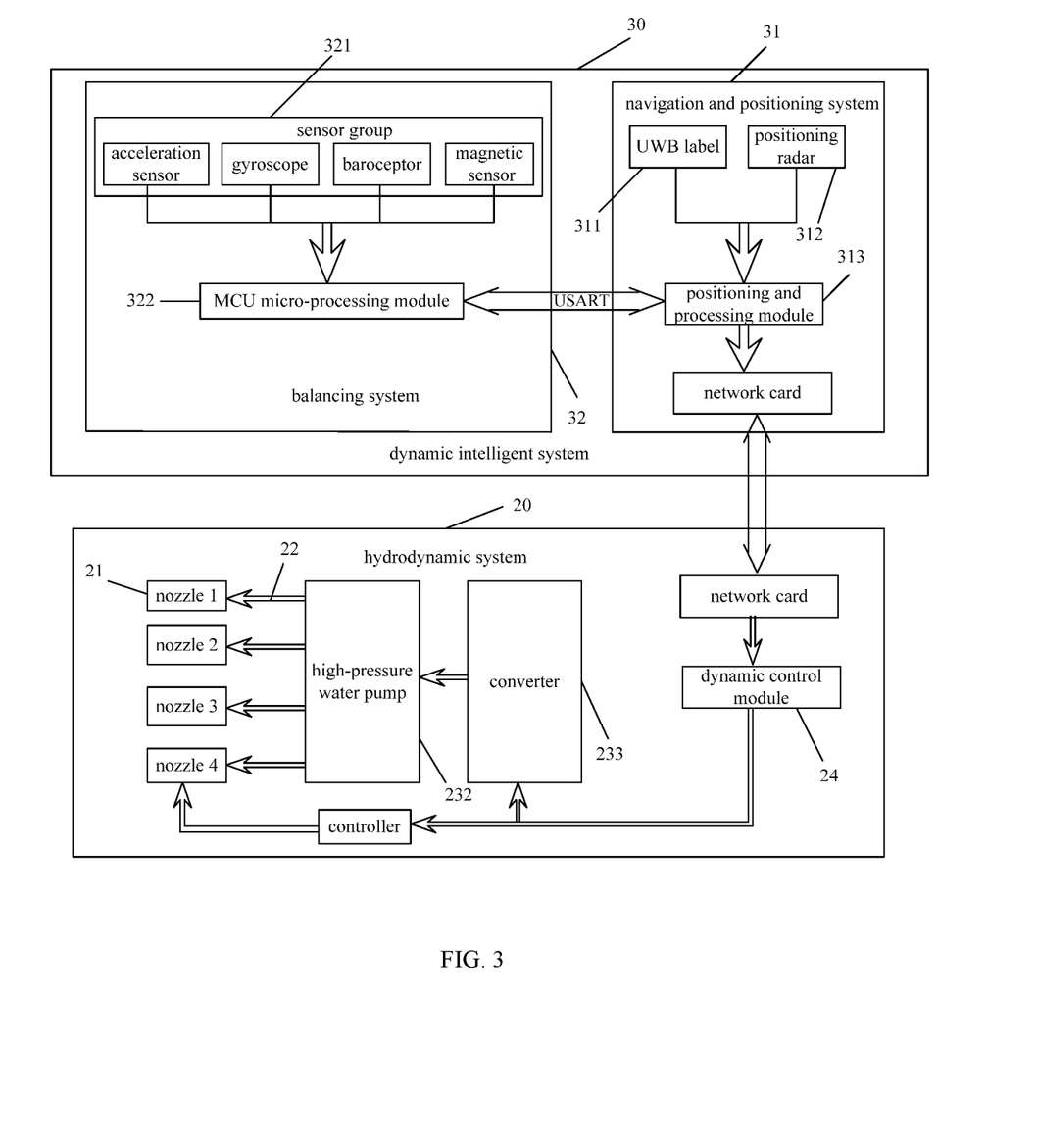
FIG. 3 is a schematic diagram of overall modules of the hydrodynamic intelligent robot of the present disclosure.

Referring to FIG. 3, the dynamic intelligent system 30 includes a navigation and positioning system 31 and a balancing system 32.

Furthermore, the navigation and positioning system 31 is configured to input motion instructions for guiding the moving platform 10 to move and then monitor an actual cruise trajectory of the moving platform 10, so as to determine an expected angle of the moving platform 10 in real time that needs to be adjusted during an actual cruise, and the motion instructions includes position data indicating a moving trajectory of the moving platform 10.

In an embodiment of the present disclosure, the navigation and positioning system 31 is configured to input the motion instructions by a touch screen or directly controlled by a control hand board.

Furthermore, after inputting motion tracks of the motion instructions, the navigation and positioning system 31 is needed to position a current position of the moving platform 10, and calculate and judge an expected angle to be adjusted next, and then control the dynamic control module 24 to adjust the vector adjusting nozzle 21S, so that the moving platform 10 can move according to the expected angle to realize trajectory control. The expected angle refers to an Euler angle between a plane of the moving platform 10 at a next moment and a plane of the moving platform 10 at a current moment. It should be noted that the expected angle is needed to be calculated by pre-judgment algorithm built into the navigation and positioning system 31 in advance.

Referring to FIG. 3, specifically, the navigation and positioning system 31 includes an Ultra Wide Band (UWB) label 311 pre-stored in the navigation and positioning system 31, a positioning radar 312 and a positioning and processing module 313.

The positioning and processing module 313 is configured to receive positioning information of the UWB label 311 and the positioning radar 312, and determine the expected angle of the moving platform 10 by positioning algorithm, and then send the expected angle to the balancing system 32.

Furthermore, the positioning and processing module 313 is a calculation unit configured to calculate the expected angle in the navigation and positioning system 31.

A special calculation method is that the positioning and processing module 313 is configured to obtain X and Y coordinates of the moving platform 10 through the UWB label 311 according to cruise trajectory information of the moving platform 10, and obtain Z coordinate of the moving platform 10 through the positioning radar 312, and then determine the expected angle of the moving platform 10 at a next movement through single-ring PID algorithm.

Furthermore, in an embodiment of the present disclosure, the expected angle calculated by the navigation and positioning system 31 is preset a maximum value, and an expected angle calculated by PID algorithm is less than the maximum value, for example, the maximum value is 30°, which can ensure that the moving platform 10 is safe enough rather than to bring danger during its rotation. For example, when a person on the moving platform 10 is for a fly show, if the moving platform 10 is rotated too much fast, which will cause the person to fall down.

Referring to FIG. 3, furthermore, the balancing system 32 includes a sensor group 321 and an MCU micro-processing module 322.

The sensor group 321 is mounted on the moving platform 10 and configured to detect data information of the moving platform 10, and includes a combination of at least one or more of the following sensors, a gyroscope, a magnetic sensor, an acceleration sensor and a baroceptor.

In a typical application, the sensor group 321 includes all of the gyroscope, the magnetic sensor, the acceleration sensors, and the baroceptor. Furthermore, angle information of the moving platform 10 can be obtained through the gyroscope, magnetic information of the moving platform 10 can be obtained through the magnetic sensor, acceleration information can be obtained through the acceleration sensor, and air pressure information can be obtained through the baroceptor.

The MCU micro-processing module 322 is configured to process the data information detected by the sensor group 321 and the expected angle to determine a final control quantity of the moving platform 10.

Figure 4:
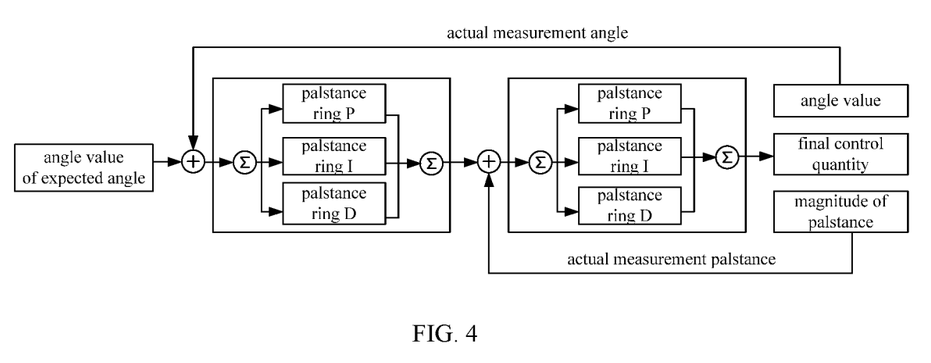
FIG. 4 is a schematic diagram of a double-layer PID algorithm calculation model of the hydrodynamic intelligent robot of the present disclosure.

Referring to FIG. 4, specifically, during calculation the data information, the MCU micro-processing module 322 is configured to process the data information of the sensor group 321 through Kalman filter algorithm, and then calculate the angle information and the acceleration information through double-layer PID algorithm to obtain the final control quantity of the moving platform 10.

Specifically, the double-layer PID algorithm includes two layers calculation algorithm. The first layer, an expected palstance is determined by a difference between the expected angle and an actual measured angle; the second layer, the final control quantity of the moving platform 10 is determined by a difference between the expected palstance and an actual measured palstance.

In an embodiment of the present disclosure, the final control quantity is vector data, that is, the final control quantity includes, controlling water spraying quantity of the nozzle 21 and adjusting a water spraying direction of the at least one vector adjusting nozzle 21S.

Furthermore, the magnetic information is used to modify attitude signals of the moving platform 10, and the pressure information is used to correct the expected angle information of the moving platform 10.

After the final control quantity is determined, the MCU micro-processing module 322 is further configured to send the final control quantity to the hydrodynamic system 20 and then control a flow vector value of the nozzle 21 by the hydrodynamic system 20, so as to control the moving platform 10 to move autonomously and intelligently.

Specifically, the dynamic control module 24 of the hydrodynamic system 20 is configured to receive the final control quantity and control the controller 231 and the converter 233 respectively according to the final control quantity so as to control water output of the plurality of pipelines 22 connected with the high-pressure pump 232 and control a vector angle of the plurality of nozzles 21.

In the present disclosure, users can input control instructions with motion trajectory according to the dynamic intelligent system 30, for example, through a software visual interface operation; the dynamic intelligent system 30 is configured to calculate a current position and an expected moving vector (including an angle and a hydrodynamic force) of the moving platform 10 according to the control instructions, and then send a determined final control quantity to the hydrodynamic system 20, and then, the hydrodynamic system 20 is configured to control water quantity and water angle sprayed from each nozzle according to the final control quantity, so as to control the moving platform 10 to move in accordance with a recorded predetermined motion trajectory. The present structure can move intelligently and autonomously only by setting a motion trajectory rather than needing manual operation and control, which can overcome technical problems such as difficulty in operation, low safety and unintelligent control of conventional floating aircrafts.

Figure 5:
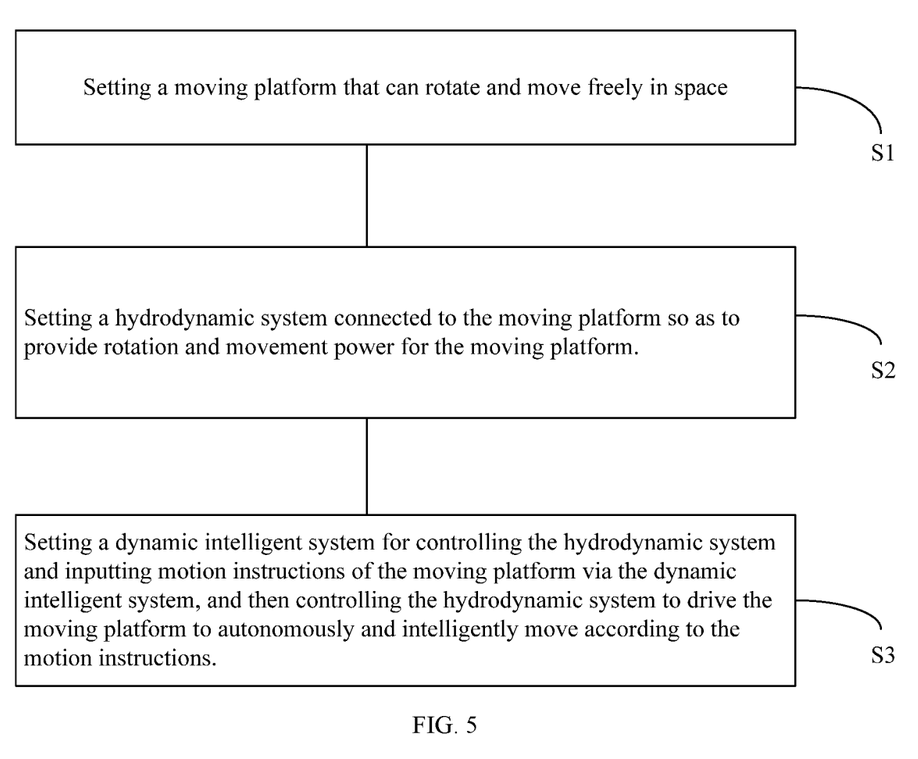
FIG. 5 is a flowchart of a control method of the hydrodynamic intelligent robot of the present disclosure.

Referring to FIG. 5, a control method of a hydrodynamic intelligent robot according to an embodiment of the present disclosure includes the following steps:

Step S1, setting a moving platform 10 that can rotate and move freely in space.

In an embodiment of the present disclosure, the moving platform 10 is designed disk-like configuration so that not only the hydrodynamic system 20 is conveniently arranged thereof, but also direction and speed of the moving platform 10 can be easily controlled because a distance between each edge of the disk-like moving platform 10 and a center point of the disk-like moving platform 10 is equal.

Step S2, setting a hydrodynamic system 20 connected to the moving platform 10 so as to provide rotation and movement power for the moving platform 10.

Furthermore, the hydrodynamic system 20 includes a plurality of nozzles 21 and a high-pressure pump 232 connected with the plurality of nozzles 21 through a plurality of pipelines 22 one to one for supplying water to the plurality of nozzles 21. A controller 231 and a converter 233 are arranged on the high-pressure pump 232. The hydrodynamic system 20 is configured to control the water spraying direction of the nozzle 21 by controlling the controller 231 or controlling open-and-close and the water output of the inclining nozzle 21D mounted at an inclined angle on the moving platform 10 so as to adjust the moving direction of the moving platform 10, and control the water output of the nozzle 21 by controlling the converter 233.

The control method includes the hydrodynamic system 20 with a plurality of nozzles 21 is mounted on the moving platform 10, and the water output and/or an outlet angle of each nozzle 21 is independently controlled according to the final control quantity.

Step S3, setting a dynamic intelligent system 30 for controlling the hydrodynamic system 20 and inputting motion instructions of the moving platform 10 via the dynamic intelligent system 20, and then controlling the hydrodynamic system 20 to drive the moving platform 10 to autonomously and intelligently move according to the motion instructions.

The step S3 of controlling the hydrodynamic system 20 includes:

Step S31, inputting the motion instructions for guiding the moving platform 10 to move and monitoring an actual cruise trajectory of the moving platform 10, so as to determine an expected angle of the moving platform 10 in real time that needs to be adjusted during an actual cruise, according to positioning algorithm, wherein the motion instructions includes position data indicating a moving trajectory of the moving platform 10.

The step S31 of determining in real time an expected angle of the moving platform 10 includes, monitoring position information pre-stored in an Ultra Wide Band (UWB) label 311 and a positioning radar 312, with the position information indicating a moving trajectory of the moving platform 10, and then determining the expected angle of the moving platform 10 by the positioning algorithm. Furthermore, the positioning algorithm is that the positioning and processing module 313 is configured to obtain X and Y coordinates of the moving platform 10 through the UWB label 311 according to cruise trajectory information of the moving platform 10, and obtain Z coordinate of the moving platform 10 through the positioning radar 312, and then determine the expected angle of the moving platform 10 at a next movement through the single-ring PID algorithm.

Step S32, determining a current actual angle and an actual palstance of the moving platform 10 by monitoring the moving platform 10, and further determine the control quantity of the moving platform 10 according to the current actual angle, the palstance and the expected angle.

The step S32 of determining the final control quantity includes: detecting a plurality of data information of the moving platform 10, and processing the detected data information and the expected angle to determine the final control quantity; wherein the plurality of data information includes at least one or more combinations of angle information, magnetic information, acceleration information and pressure information.

Referring to FIG. 4, furthermore, the final control quantity is determined that the data information of the sensor group 321 is processed through the Kalman filter algorithm, and then the final control quantity of the moving platform 10 can be obtained by calculating the angle information and the acceleration information through the double-layer PID algorithm.

Specifically, referring to FIG. 4, the double-layer PID algorithm includes two layers calculation algorithm. The first layer, an expected palstance is determined by a difference between the expected angle and an actual measured angle; the second layer, the final control quantity of the moving platform 10 is determined by a difference between the expected palstance and an actual measured palstance.

In an embodiment of the present disclosure, the final control quantity is vector data, that is, the final control quantity includes, controlling the water spraying quantity of the nozzle 21 and adjusting the water spraying direction of the at least one vector adjusting nozzle 21S.

Or in the technical scheme, the inclining nozzle 21D mounted at an inclined angle on the moving platform 10, the final control quantity is used to control open-and-close and the water output of the inclining nozzle 21D, so as to adjust the moving direction of the moving platform 10.

Figure 6:
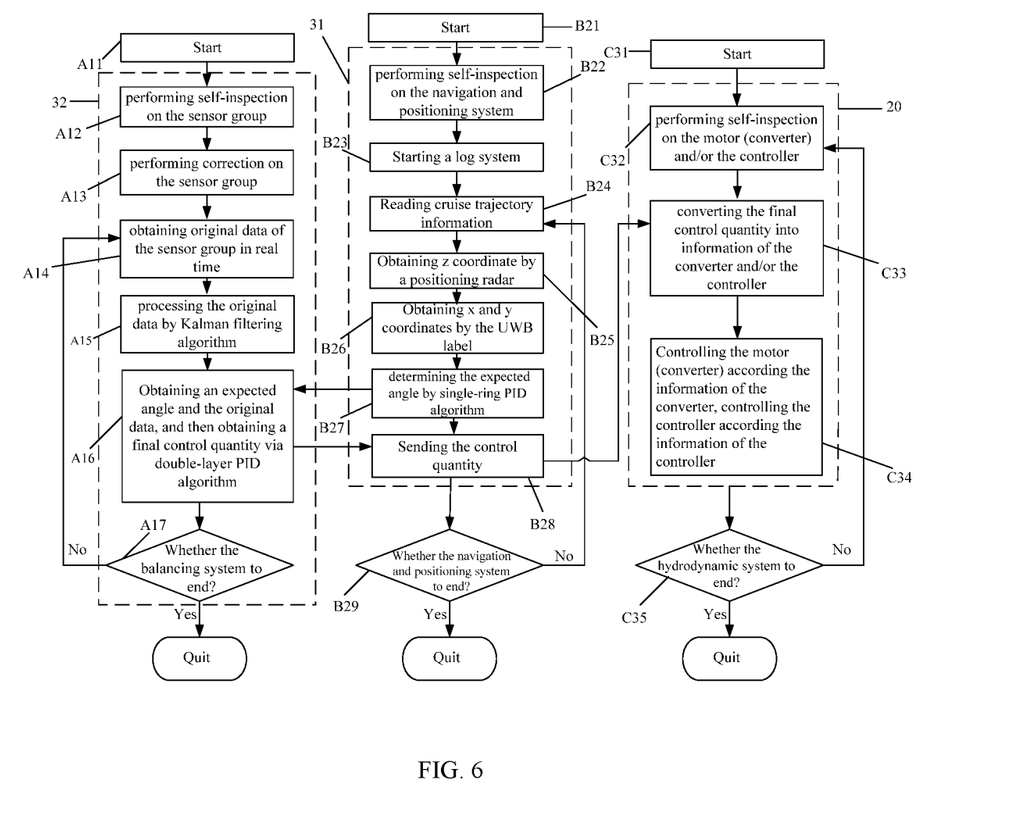
FIG. 6 is a workflow diagram of the control method of the hydrodynamic intelligent robot of the present disclosure.

Referring to FIG. 6, the hydrodynamic robot of the present disclosure can start and work in sequence according to the following workflow:

Step A11, starting the balancing system 32.
Step A12, performing self-inspection on the sensor group 321.
Step A13, performing correction on the sensor group 321.
Step A14, obtaining original data of the sensor group 321 arranged on the moving platform 10 in real time.
Step A15, processing the original data by the Kalman filtering algorithm.
Step A16, obtaining an expected angle and the original data after being processed in the step A15 and then obtaining a final control quantity via the double-layer PID algorithm and then sending the final control quantity to Step B28.
Step A17, determining whether the balancing system 32 is ended. If it is finished, exit the program; otherwise, repeating steps A14-A16.
Step B21, starting the navigation and positioning system 31.
Step B22, performing self-inspection on the navigation and positioning system 31.
Step B23, starting a log system.
Step B24, Reading cruise trajectory information.
Step B25, Obtaining z coordinate by the positioning radar 312.
Step B26, Obtaining x and y coordinates by the UWB label 311.
Step B27, determining the expected angle by the single-ring PID algorithm and then sending the expected angle to the step A16.
Step B28, sending the final control quantity to step C33.
Step B29, determining whether the navigation and positioning system 31 is ended. If it is finished, exit the program; otherwise, repeating steps B24-B28.
Step C31, starting the hydrodynamic system 20.
Step C32, performing self-inspection on the motor (converter 233) and/or the controller 231.
Step C33, converting the final control quantity into information of the converter 233 and/or the controller 231.
Step C34, controlling the motor (converter 233) according the information of the converter 233 and/or controlling the controller 231 according the information of the controller 231.
Step C35, determining whether the hydrodynamic system 20 is ended. If it is finished, exit the program; otherwise, repeating steps C33-C34.

The above embodiment is a preferred embodiment of the present disclosure, but a protection scope of the present disclosure is not limited by the above embodiment, any other changes, modifications, substitutions, combinations and simplifications within the principles of the present disclosure to the full extent indicated by the broad general meaning of the terms in which the appended claims are expressed.

In the description of the present disclosure, it is to be understood that terms indicated an orientation or a position relation is based on the orientation or position relation shown in the attached drawings and is used only for conveniently describe and simplify the present disclosure, rather than indicating or suggesting that the referred equipments or components must have a particular orientation, and be constructed and operated in the particular orientation without being construed as a limitation of the present disclosure.

What is claimed is:

1. A control method of a hydrodynamic intelligent robot comprising,
   step S1, setting a moving platform that can rotate and move freely in space;
   step S2, setting a hydrodynamic system connected to the moving platform so as to provide rotation and movement power for the moving platform; wherein the hydrodynamic system comprises at least one nozzle mounted on the moving platform, and a hydrodynamic device connected to the at least one nozzle by a pipeline;

step S3, setting a dynamic intelligent system and a processor, the dynamic intelligent system electrically connected to the hydrodynamic device, wherein the processor is electrically connected to the dynamic intelligent system and performed a plurality of programs stored in a memory of the hydrodynamic intelligent robot; and wherein the processor is configured to control the hydrodynamic system and input motion instructions of the moving platform via the dynamic intelligent system, and then control the hydrodynamic system to drive the moving platform to autonomously and intelligently move according to the motion instructions; and wherein the processor is further configured to:

input the motion instructions for guiding the moving platform to move, and monitor the actual cruise trajectory of the moving platform, so as to determine an expected angle of the moving platform in real time that needs to be adjusted during an actual cruise, according to a positioning algorithm, the motion instructions comprising position data indicating a moving trajectory of the moving platform; and determine a current actual angle and an actual palstance of the moving platform by monitoring the moving platform, and further determine a final control quantity of the moving platform according to the current actual angle, the actual palstance and the expected angle; and then control the at least one nozzle to eject water with a corresponding vector size, according to the final control quantity of the moving platform, so as to realize movement control of the moving platform.

2. The control method as claimed in claim 1, wherein the step S31 of determining in real time an expected angle of the moving platform comprises, monitoring position information pre-stored in an Ultra Wide Band (UWB) label and a positioning radar, with the position information indicating a moving trajectory of the moving platform, and then determining the expected angle of the moving platform by the positioning algorithm.

3. The control method as claimed in claim 2, wherein the step S32 of determining the final control quantity comprises, detecting a plurality of data information of the moving platform, and processing the detected data information and the expected angle to determine the final control quantity; wherein the plurality of data information comprising at least one or more combinations of angle information, magnetic information, acceleration information and pressure information.

4. The control method as claimed in claim 3, wherein the at least one nozzle comprises a plurality of nozzles configured to independently control the water output and an outlet angle of each nozzle according to the final control quantity or the at least one nozzle comprising an inclining nozzle mounted at an inclined angle on the moving platform and configured to independently control open-and-close and the water output of the at least one inclining nozzle according to the final control quantity;

the processor further configured to control a moving direction and a speed of the moving platform according to the final control quantity.

* * * * *